US012242953B2

(12) United States Patent
Armstrong et al.

(10) Patent No.: US 12,242,953 B2
(45) Date of Patent: Mar. 4, 2025

(54) AUTOMATIC TRIAGING OF NETWORK EVENTS

(71) Applicant: Proofpoint, Inc., Sunnyvale, CA (US)

(72) Inventors: Kyle Armstrong, Eugene, OR (US); Skyler Butler, Denver, CO (US)

(73) Assignee: PROOFPOINT, INC., Sunnyvale, CA (US)

( * ) Notice: Subject to any disclaimer, the term of this patent is extended or adjusted under 35 U.S.C. 154(b) by 970 days.

(21) Appl. No.: 16/596,406

(22) Filed: Oct. 8, 2019

(65) Prior Publication Data

US 2021/0103808 A1  Apr. 8, 2021

(51) Int. Cl.
| | |
|---|---|
| *G06N 3/08* | (2023.01) |
| *G06N 3/04* | (2023.01) |
| *H04L 9/40* | (2022.01) |
| *H04L 41/06* | (2022.01) |
| *H04L 41/16* | (2022.01) |

(52) U.S. Cl.
CPC ............... *G06N 3/08* (2013.01); *G06N 3/04* (2013.01); *H04L 41/06* (2013.01); *H04L 41/16* (2013.01); *H04L 63/20* (2013.01)

(58) Field of Classification Search
CPC . G06N 3/08; G06N 3/04; H04L 41/06; H04L 41/16; H04L 63/20
See application file for complete search history.

(56) References Cited

U.S. PATENT DOCUMENTS

| | | | |
|---|---|---|---|
| 8,832,780 B1 | 9/2014 | Sarin et al. | |
| 8,862,522 B1 | 10/2014 | Jaiswal et al. | |
| 9,183,384 B1 * | 11/2015 | Bruhmuller | G06F 21/552 |
| 9,654,510 B1 * | 5/2017 | Pillai | H04L 63/1416 |
| 9,892,253 B1 * | 2/2018 | Mehr | G06F 21/52 |
| 10,270,788 B2 | 4/2019 | Faigon et al. | |
| 10,320,813 B1 * | 6/2019 | Ahmed | H04L 63/1416 |
| 10,885,393 B1 * | 1/2021 | Sirianni | G06F 18/2411 |
| 11,483,326 B2 * | 10/2022 | Meir | G06N 20/00 |
| 2010/0223499 A1 * | 9/2010 | Panigrahy | G06F 11/0709 |
| | | | 714/E11.178 |
| 2012/0150773 A1 * | 6/2012 | DiCorpo | G06N 20/00 |
| | | | 706/12 |

(Continued)

OTHER PUBLICATIONS

International Search Report and Written Opinion of the International Searching Authority dated Jan. 13, 2021, issued in corresponding International Patent Application No. PCT/US2020/053216 (13 pgs.).

(Continued)

*Primary Examiner* — Nicholas R Taylor
*Assistant Examiner* — Angela Widhalm De Rodriguez
(74) *Attorney, Agent, or Firm* — Sprinkle IP Law Group

(57) ABSTRACT

Automatically triaging network events such as data loss prevention (DLP) incidents is disclosed. A system can automatically triage or classify an incident using a prediction model. The prediction model can determine the classification based on similar incidents that were previously classified. Similar incidents are those incidents having profiles that match a profile of the incident. The profile can include one or more attributes that are representative of an incident. The system can arrive at a specific classification for the incident based on a classification of the similar incidents if the similar incidents satisfy one or more conditions.

20 Claims, 11 Drawing Sheets

(56) References Cited

U.S. PATENT DOCUMENTS

| | | | |
|---|---|---|---|
| 2013/0073557 A1* | 3/2013 | Nezhad | G06F 16/24578 |
| | | | 707/E17.014 |
| 2014/0045529 A1* | 2/2014 | Bolon | H04L 67/52 |
| | | | 455/456.1 |
| 2015/0150773 A1 | 6/2015 | Krueger et al. | |
| 2015/0254555 A1* | 9/2015 | Williams, Jr. | G06N 3/084 |
| | | | 706/14 |
| 2018/0018593 A1* | 1/2018 | Benavides | G08B 21/0288 |
| 2019/0394215 A1* | 12/2019 | Lee | G06N 20/00 |
| 2020/0285737 A1* | 9/2020 | Kraus | G06F 21/552 |
| 2021/0273865 A1* | 9/2021 | Jing | H04L 43/062 |

OTHER PUBLICATIONS

International Preliminary Report on Patentability (IPRP), issued for International PCT Application No. PCT/US2020/053216, mailed Apr. 21, 2022, 9 pages.

* cited by examiner

| Applied Filters | Summarized by Assuming Status and |
| Status Equals All | Date Custom 5/27/19, |

348

[Collapse All]

| Assuming Status ▲ | Total |
| --- | --- |
| Totals | 939 |
| ▽ False Positive | 213 |
|    False Positive | 204 |
|    Indeterminate Behavior | 9 |
| ▽ Indeterminate Behavior | 282 |
|    Authorized Business Process | 24 |
|    False Positive | 2 |
|    Indeterminate Behavior | 256 |
| ▽ Not enough data | 426 |
|    False Positive | 128 |
|    Indeterminate Behavior | 297 |
|    Personal Use | 1 |
| ▽ Uncertain | 18 |
|    False Positive | 7 |

FIG. 3D

AUTOMATIC TRIAGING OF NETWORK EVENTS

FIELD OF THE INVENTION

The invention relates to data loss prevention, and more specifically, to automatically triage data loss prevention incidents.

BACKGROUND OF THE INVENTION

Organizations that leverage data loss prevention (DLP) products are well-aware of the hidden cost behind the triage of incidents, which include license purchases, setup costs, and consulting fees. The proper use of DLP requires an organization assign an individual to monitor incoming events. This individual is required to dissect the contents of each event, attempting to conclude whether the information included demonstrates actual data loss (e.g., data leak and/or data breach). Failure to properly perform an accurate analysis of each incident may result in substantial financial damages for an organization. An individual may take a significant amount of time, e.g., five minutes to analyze and triage an incident. This can be a time consuming and tedious process, especially with businesses where the incident backlogs are in the thousands.

Given the scale of incidents, organizations may have to employ a significant number of staff to triage the incidents, which is not only a significant expense for an organization but can also be inefficient as it can increase the consumption of computing resources. Further, involving a such a large number of humans can increase the potential for human error in triaging the incidents significantly, which can result in a decreased accuracy of triaging. Accordingly, in such cases, time, energy, and other resources (whether machine or human resources) are needlessly utilized on the computer systems. These and other drawbacks exist. Thus, there is a need to triage the incidents more efficiently and more accurately.

SUMMARY OF THE INVENTION

Aspects of the invention relate to methods, apparatuses, and/or systems for automatically triaging network events such as data loss prevention (DLP) incidents. In some embodiments, a DLP incident is a notification presented to a user, such as an administrator, detailing certain behaviors of interest, such as policy violations. For example, DLP applications can track user actions or other events in a computer network that share sensitive information such as social security numbers or credit card numbers. If such a number were to be sent in an email to an unauthorized user, the DLP application can determine that a policy is likely violated and create a DLP incident ("incident") accordingly.

In some embodiments, a system can automatically triage or classify an incident based on similar incidents that were previously classified. The system can arrive at a specific classification for the incident based on a classification of the similar incidents that were previously classified. In some embodiments, a classification of the incident is representative of a certain behavioral trait, such as a specific policy violation, an indeterminate behavior, a false positive, etc. The system can determine the similar incidents by selecting those incidents that have profiles matching a profile of the incident. The profile can include a username of the user associated with the incident, a policy that is violated by the incident, a policy match count that indicates a number of policies violated by the incident, a workstation where the incident occurred, a website where the incident occurred, a filename where the incident occurred, a file destination, policy version history, application used (in the movement of sensitive information), or the actual afflicting content.

The classification for the incident can be determined in various ways, for example, based on a prediction model. In some embodiments, training information may be provided as input to a prediction model to generate predictions related to the classification of the incident. As an example, the training information may indicate a profile of an incident and a classification of the incident for multiple incidents. In some embodiments, classification result information may be provided as reference feedback to the prediction model. As an example, the classification result information may be related to a performance of the classification process (e.g., whether the predicted classification is correct or incorrect). The prediction model may update one or more portions of the prediction model based on the predictions and the classification result information. Subsequent to the updating of the prediction model, the prediction model may be used to process the incident profile to determine the classification of the incident.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 3D is a screenshot of a report showing incidents classified in audit mode, consistent with various embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1A:
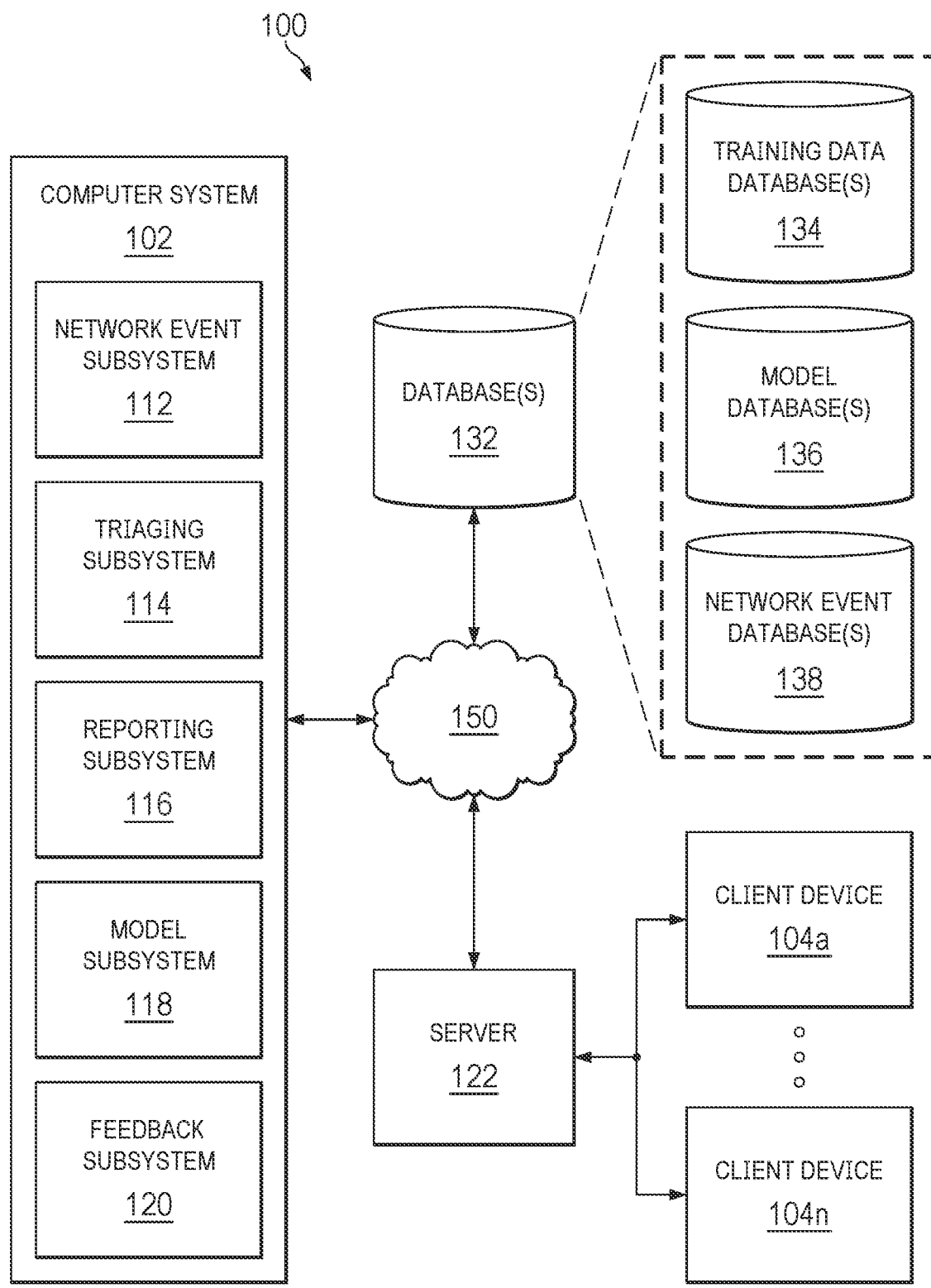
FIG. 1A shows a system for automatically triaging a network event, in accordance with one or more embodiments.

FIG. 1A shows a system 100 for automatically triaging a network event, in accordance with one or more embodiments. As shown in FIG. 1A, system 100 may include computer system 102, client device 104 (or client devices 104a-104n), or other components. Computer system 102 may include network event subsystem 112, triaging subsystem 114, report generation subsystem 116, model subsystem 118, feedback subsystem 120, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, such as server 122, or other components of system 100. In some embodiments, the server 122 and the client devices 104a-104n can be part of a local area network (LAN) and the server 122 can provide access to an external network, e.g., Internet, to the client devices 104a-104n. It should be noted that, while one or more operations are described herein as being performed by particular components of computer system 102, those operations may, in some embodiments, be performed by other components of computer system 102 or other components of system 100. As an example, while one or more operations are described herein as being performed by components of computer system 102, those operations may, in some embodiments, be performed by components of client device 104, server 122, or other machines (not illustrated). It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

In some embodiments, system 100 triages, that is, classifies a network event. A network event can be related to any user activity in a computer network. For example, a network event can be a DLP incident ("incident"), which is representative of a user activity that likely violated a data access policy causing a possible data loss or data leak. The user activity can be related to one or more data items, e.g., files, emails, user interface such as web interface, etc. An incident can include one or more attributes ("network event data") such as a username of the user associated with the incident, a policy that is violated by the incident, a policy match count, a workstation where the incident occurred, a website where the incident occurred, a filename where the incident occurred, a file destination, policy version history, application used (in the movement of sensitive information), or the actual afflicting content. As an example, triaging a network event includes determining a classification for the network event, which can be indicative of certain behavioral traits. In some embodiments, the classification can also indicate if the network event is a false positive, false negative, or if there is insufficient data for classification.

When a network event is generated or received by computer system 102, system 100 determines the classification of the network event. In some embodiments, the determination of the classification can include system 100 determining a profile of the network event, determining previously classified similar network events, which are network events having profiles matching the profile of network event, and determining the classification of the network event based on the classification of the similar network events. As an example, system 100 can determine a profile of the incident, which includes one or more attributes of the incident (mentioned above), determine previously classified incidents (e.g., from network event database 138) that have profiles matching the profile of the incident, and determine the classification of the incident as the classification of the previously classified similar incidents.

In some embodiments, determining the classification of the incident can include system 100 determining whether the similar incidents satisfy certain conditions. As an example, system 100 may determine a specific classification associated with the previously classified similar incidents as the classification of the incident based on (a) a quantity of the similar incidents identified exceeding a first threshold and (b) a confidence interval of the specific classification of one or more classifications associated with the similar incidents exceeding a second threshold. If either condition, (a) or (b), is not satisfied, system 100 may determine the classification as "not enough data to classify."

In some embodiments, an incident can have multiple status attributes indicating a classification of the incident. A first status attribute (referred to as "status" attribute) is indicative of the actual classification of the incident, which can be determined by the computer system 102 (e.g., as described above) or another entity, such as a human user. A second status attribute (referred to as "assuming status" attribute) is indicative of an "assumed" classification, which is determined by the computer system 102. The status attributes that are updated by computer system 102 can depend on a mode in which system 100 is operating. For example, in a first mode (referred to as "audit" mode), system 100 may update the "assuming status" attribute with the resulting classification and leave the status attribute with the original value. In a second mode (referred to as the "triage" mode), system 100 updates the status attribute with the resulting classification, and optionally, the "assuming status" attribute too. One of the benefits of running system 100 in the audit mode is that a user, e.g., an administrator who reviews the incidents, can compare the classification of an incident determined by a human user (e.g., as indicated in the status attribute) with the classification determined by computer system 102 (e.g., as indicated in the assuming status attribute) for further analysis. If the user determines that computer system 102 is correct in determining the classification, the user may update the status attribute of the incident with the classification indicated in the assuming status attribute. On the other hand, if the user determines that computer system 102 determined the classification incorrectly, the user may provide the feedback (e.g., an indication that computer system 102 is incorrect and the correct classification), which system 100 can use to improve the accuracy in determining the classification for subsequent incidents.

In some embodiments, system 100 may train a prediction model to determine the classification of an incident. In some embodiments, system 100 may generate a profile of the incident and provide such information as input to a prediction model to generate predictions (e.g., related to classification of the incident). As an example, the profile may indicate a username of the user associated with the incident, a policy that is violated by the incident, a policy match count that indicates a number of policies violated by the incident, a workstation where the incident occurred, a website where the incident occurred, a filename where the incident occurred, a file destination, policy version history, application used (in the movement of sensitive information), or the actual afflicting content. In some embodiments, system 100 may provide classification result information as reference feedback to the prediction model, and the prediction model may update one or more portions of the prediction model based on the predictions and the classification result information. As an example, the classification result information can indicate a correct classification of the incident. In this way, for example, the prediction model may be trained or configured to generate more accurate predictions.

As such, in some embodiments, subsequent to the updating of the prediction model, system 100 may use the prediction model to determine the classification of an incident. As an example, system 100 may obtain and provide information related to profile of the incident to obtain one or more predictions from the prediction model. System 100 may use the predictions to determine the classification of the incident. In one use case, the prediction model may generate a prediction specifying the classification of the incident. In another use case, the prediction model may generate a prediction specifying a probability of the determined classification for the incident.

In some embodiments, the prediction model may include one or more neural networks or other machine learning models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it propagates to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

Figure 2:
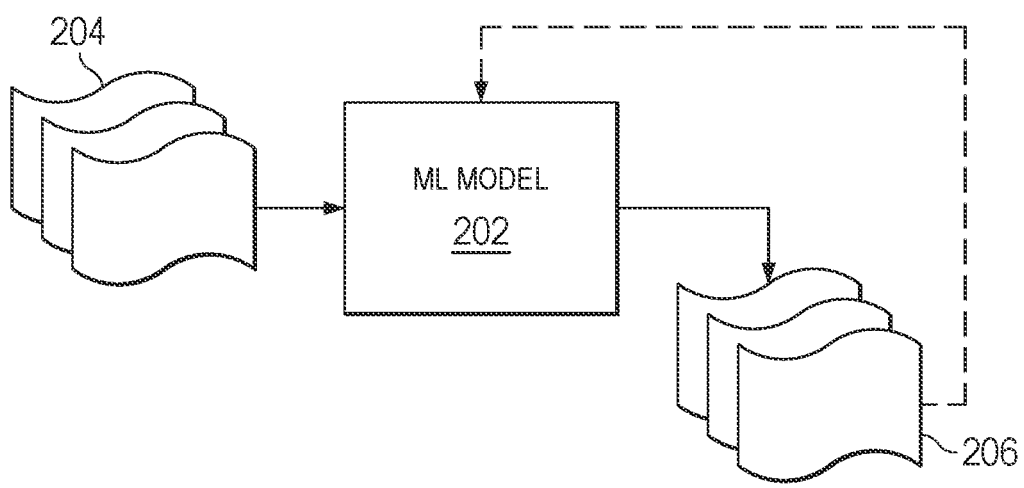
FIG. 2 shows a machine learning model configured to facilitate automatic triaging of a network event, in accordance with one or more embodiments.

As an example, with respect to FIG. 2, machine learning model 202 may take inputs 204 and provide outputs 206. In one use case, outputs 206 may be fed back to machine learning model 202 as input to train machine learning model 202 (e.g., alone or in conjunction with user indications of the accuracy of outputs 206, labels associated with the inputs, or with other reference feedback information). In another use case, machine learning model 202 may update its configurations (e.g., weights, biases, or other parameters) based on its assessment of its prediction (e.g., outputs 206) and reference feedback information (e.g., user indication of accuracy, reference labels, or other information). In another use case, where machine learning model 202 is a neural network, connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 202 may be trained to generate better predictions.

Subsystems 112-120

In some embodiments, network event subsystem 112 facilitates management of network events, such as incidents. As described above, an incident is representative of a user activity that likely violated a data access policy causing a possible data loss, data breach or data leak. For example, if an organization of which the server 122 and client devices 104a-104n are a part defines a data access policy which considers sharing of social security numbers outside of the organization is a data breach, then any movement of information having social security numbers by users associated with client devices 104a-104n, e.g., via email, file upload to a cloud service, storing in a file in an unauthorized location, can potentially be considered a data access policy violation, and an incident can be generated for the same.

Figure 3A:
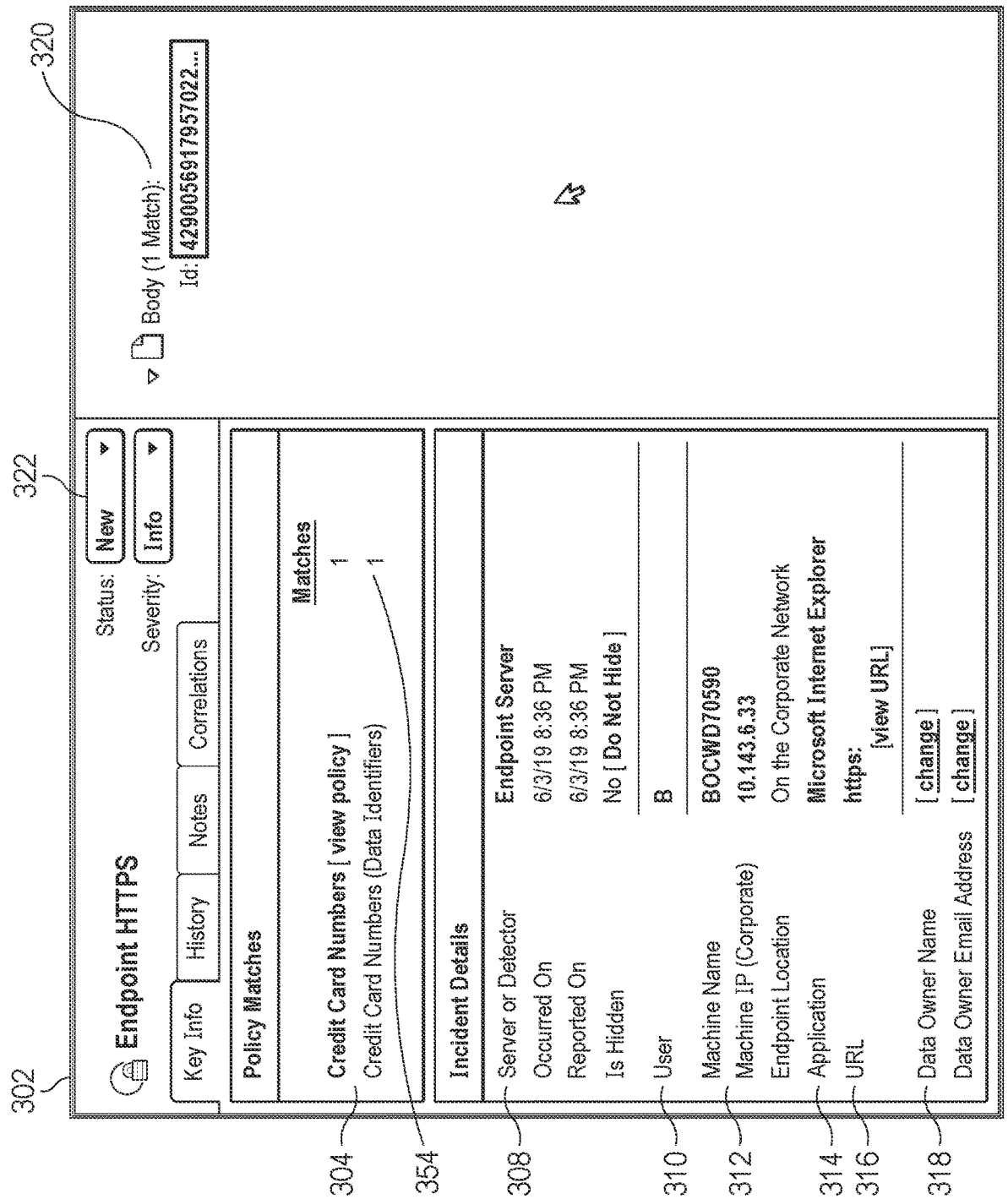
FIG. 3A is a screenshot showing details of an incident, consistent with various embodiments.

FIG. 3A is a screenshot showing details of an incident 302, consistent with various embodiments. An incident 302 can include one or more attributes such as a policy 304 that is violated by the incident, a policy match count that indicates a number of policies violated by the incident, a type 308 of the incident, a username 310 of the user associated with the incident, a workstation 312 where the incident occurred/initiated, application 314 used (in the movement of sensitive information), a website 316 where the incident occurred, a filename where the incident occurred, a file owner 318, a file destination, policy version history, or the actual afflicting content 320. In the example of FIG. 3A, a "credit card numbers (data identifiers)" policy 304 is triggered upon a user sharing at a website 316 content having a number that resembles a credit card number, resulting in the generation of the incident 302. In one example, the policy 304 can be defined to consider a data identifier/number of format, "XXXX-XXXX-XXXX-XXXX," as a credit card number and sharing of such number is a violation of the policy. Accordingly, when computer system 102 identifies content having such a number, an incident is generated. The incident 302 identifies the number resembling the credit card number as the afflicting content 320. In some embodiments, the afflicting content 320 can be part of an entire message/information the user shares at the website 316. For example, if the violation occurred based on the message, which has text "Hello, my partner ID is 4290-0569-1795-7022 with regard to the stay at . . . ," the number that is captured as a credit card number "4290-0569-1795-7022," is the actual afflicting content 320 and the remainder of the content of the message, such as "Hello, my partner ID is, with regard to the stay at . . . ," is considered as non-afflicting content. Further, in some embodiments, there can be a number of policies, like the policy 304, within "credit card numbers." An incident can violate one or more policies, and a policy match or violation count 354 indicates the number of policies violated by the incident. In FIG. 3A, the incident 302 matches one policy—policy 304.

The attribute type 308 of the incident indicates that the policy violation occurred at, or is identified by, an endpoint server, such as server 122. The attribute username 310 indicates a name or user ID of the user who caused the violation the policy 304. The attribute workstation 312 indicates a name or IP address of the machine (e.g., associated with user) at which the violation of the policy 304 originated. The attribute application 314 indicates that the policy violation occurred in an application such as "Microsoft Internet Explorer." The incident 302 also includes a status attribute 322, which indicates the classification of the incident 302. In some embodiments, the status attribute 322 is assigned a specific value, e.g., "new," to indicate that the incident 302 is a new incident that is not yet classified either by computer system 102 or human user. Note that an incident can have less, more, or different attributes than that are shown in the screenshot of FIG. 3A.

Figure 3B:
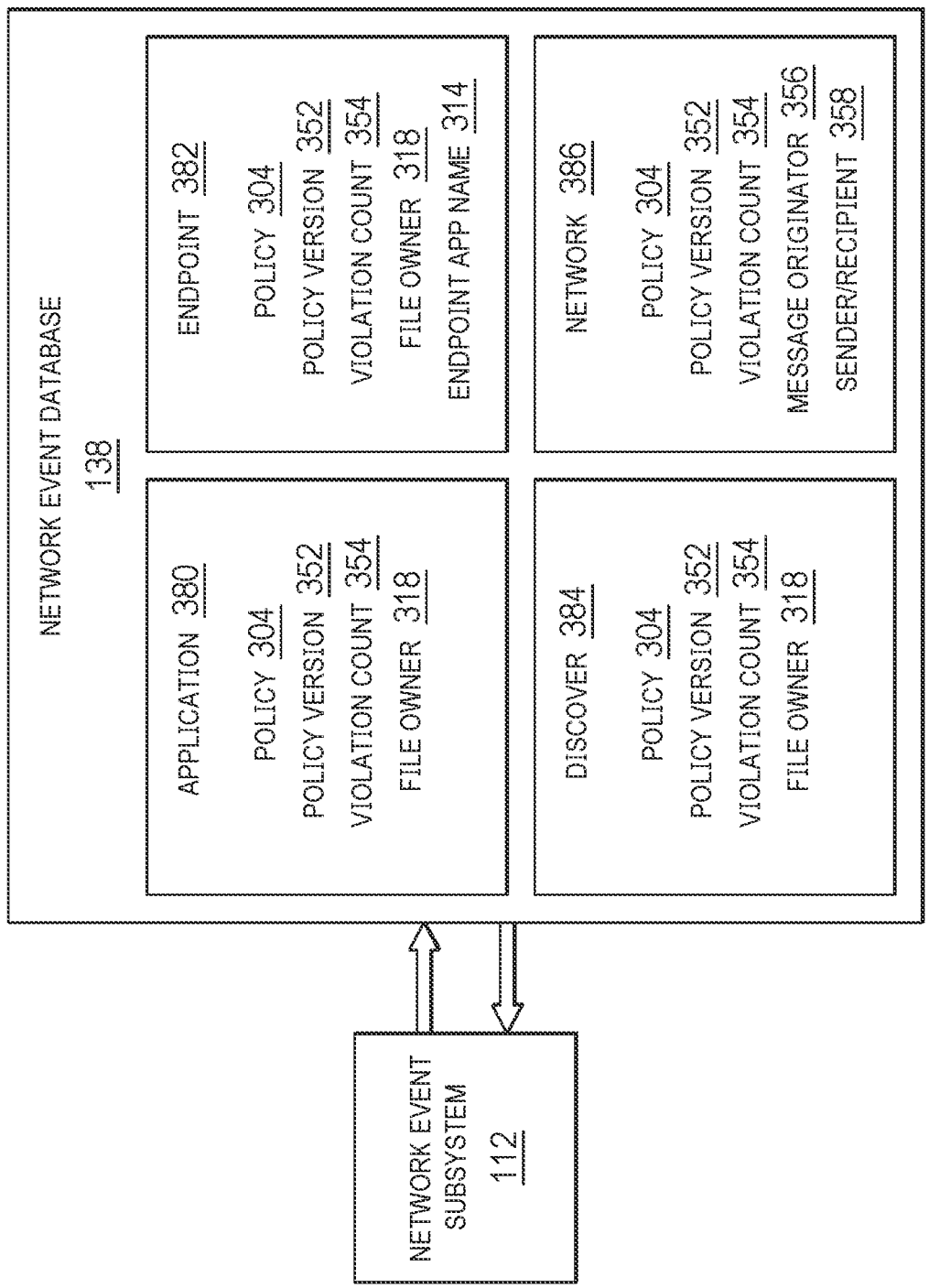
FIG. 3B shows a block diagram for generating a profile of the incident, consistent with various embodiments.

A classification of the incident is determined based on one or more attributes of the incident. In some embodiments, the actual attributes used in determining the classification of the incident depends on a type of the incident. FIG. 3B shows a block diagram for generating a profile of the incident, consistent with various embodiments. The incident 302 can be of multiple types. In some embodiments, the type 308 is representative of a location where the incident occurred/is identified. For example, a first type of incident, such as "Application" 380, can be representative of an incident that occurred in, or is identified by, a cloud-based application. A second type of incident, such as "Endpoint" 382 can be representative of an incident that occurred in, or is identified by, a server 122 or a client device 104 in the specified network. A third type of incident, such as "Discover" 384 can be representative of an incident that occurred in, or is identified by, a client device 104 (e.g., discovered by a scan of data-at-rest). A fourth type of incident, such as "Network" 386 can be representative of an incident that occurred in, or is identified by, in a network-based application, e.g., email.

For an incident of type "Application" 380 or "Discover" 384 attributes such as a policy 304 violated, a policy version 352, a policy match or violation count 354, or a file owner 318 can be used for determining the classification. For an incident of type "Endpoint" 382 attributes such as a policy 304 violated, a policy version 352, a policy match or violation count 354, a file owner 318, or an endpoint app/application 314 used can be used for determining the classification. In another example, for an incident of type "Network" 386 attributes such as a policy 304 violated, a policy version 352, a policy match count or violation count 354, a message originator 356, or a sender/recipient of the message 358 can be used for determining the classification. The policy 304, as described above, is a policy that is violated and the policy version 352 is a version of the policy 304 that is violated. The policy version 352 may or may not be considered for determining the similar incidents. In cases where the policy version 352 is considered, two incidents are determined to be similar if both their policy and policy version attributes match (provided other attributes in their respective profiles also match). In cases where the policy version 352 is not considered, two incidents are determined to be similar if their policy attributes match (provided other attributes in their respective profiles also match) regardless of the policy version 352. The policy match or violation count 354 attribute provides a count of the number of policies violated by the incident. The file owner 318 attribute provides information regarding a user who is the owner of a file or other data item which triggered the violation. The message originator 356 attribute provides information regarding an originator of a message that violates the policy 304. The sender/recipient of the message 358 attribute provides information regarding a user who sends or receives a message that violated the policy 304.

Network event subsystem 112 generates a profile of the incident based on the type of the incident. Network event subsystem 112 can determine the type 308 of the incident 302 from the incident 302, obtain attributes information for the type 308 from the network event database 138 and generate a profile for the incident 302 accordingly. The profile can include one or more attributes that are representative of a specified type of the incident (e.g., described above), and can be used in determining the classification of the incident.

In some embodiments, network event subsystem 112 can also include the non-afflicting content of the incident (also referred to as "incident data") in the profile. In some embodiments, including the non-afflicting content in the profile enables determining only those incidents whose attributes as well as the non-afflicting content match as similar incidents and ignoring those incidents whose non-afflicting content is different even though the other attributes match.

In some embodiments, network event subsystem 112 can also include variations of the non-afflicting content in the profile. For example, if the non-afflicting content is "Hello, my, partner ID is, with regard to the stay at . . . ," some variations of the same could be "Hi, my, partner ID is, with regard to the stay at . . . ," "My, partner ID is, with regard to the stay at . . . ," "My, partner ID is, for the stay at . . . " etc. By including such variations, those incidents having (a) attributes that match with the attributes of the profile, and (b) non-afflicting content that match with the non-afflicting content or variations of the non-afflicting content in the profile can be determined as similar incidents. In some embodiments, network event subsystem 112 can determine the variations of the non-afflicting content in many ways, e.g., using natural language processing (NLP).

Further, in some embodiments, network event subsystem 112 can include a hash value of the non-afflicting content, rather than the non-afflicting content, in the profile. Network event subsystem 112 can generate the hash value of the non-afflicting content by hashing the non-afflicting content using a hash function, such as secure hash algorithm (SHA). In some embodiments, using a hash value rather than the actual content can improve the speed, that is, reduce the amount of time consumed, in comparing the profile with other profiles to determine the classification.

Triaging subsystem 114 facilitates determination of the classification for a specified incident. Triaging subsystem 114 can determine the classification in many ways, e.g., using a statistical or rule-based model. In the rule-based model, triaging subsystem 114 processes the profile information of the specified incident (e.g., generated by network event subsystem 112 as described above) to determine similar incidents that were previously classified. For example, triaging subsystem 114 may search a database, such as network event database 138, to find those previously classified events that have a profile matching the profile of the specified incident. Triaging subsystem 114 determines if a quantity of the similar incidents exceeds a first threshold. If the quantity does not exceed the first threshold, triaging subsystem 114 may classify the specified incident in a "not enough data" category indicating that there is not enough data for computer system 102 to classify the specified incident. On the other hand, if the quantity exceeds the first threshold, triaging subsystem 114 determines if a confidence interval associated with any classification of one or more classifications of the similar incidents exceeds a second threshold. If the confidence interval does not exceed the second threshold, triaging subsystem 114 may classify the specified incident in a "not enough data" category indicating that there is not enough data for computer system 102 to classify the specified incident. On the other hand, if the confidence interval exceeds the second threshold, triaging subsystem 114 determines the corresponding classification of the similar incidents as the classification for the specified incident.

The thresholds can be user defined, e.g., by an administrator associated with the server 122. For example, the first threshold can be "10," which indicates that at least "11" previously classified similar incidents are to be considered by triaging subsystem 114 to determine the classification of the specified incident based on the similar incidents. Similarly, the second threshold associated with the confidence interval can be "80%" which indicates that at least "81 out of 100" previously classified similar incidents have to have a particular classification for the particular classification to be considered by triaging subsystem 114 as the classification for the specified incident.

Triaging subsystem 114 can consider two incidents as similar when the profiles of both the incidents match. The profiles of two incidents are matching when all the attributes of the profiles match. In some embodiments, the profiles of two incidents are matching when a specified set of attributes or a specified number of attributes the profiles match. The matching criterion for the profiles can be user defined, e.g., by an administrator associated with the server 122.

As another example, triaging subsystem 114 can be implemented using artificial intelligence techniques, such as a prediction model, to determine the classification of a specified incident. In some embodiments, information related to profile of incidents may be obtained and provided to the prediction model as training data to configure or train the prediction model. Such information may be stored by computer system 102 in a storage system, e.g., training database 134. In some embodiments, model subsystem 118 may obtain the training data from the training database 134 and provide such information as input to a prediction model to generate predictions. Feedback subsystem 120 may provide classification result information as reference feedback to the prediction model, and the prediction model may update its configurations (e.g., weights, biases, or other parameters) based on the predictions and the classification result information. In some embodiments, feedback subsystem 120 may provide the classification result information as reference feedback to the prediction model to cause the prediction model to assess its predictions against the classification result information. As an example, the prediction model may update its configurations (e.g., weights, biases, or other parameters) based on its assessment of the predictions. As an example, the predictions generated by the prediction model (e.g., based on the profile of incidents) may include predictions related to determining the classification of the incidents, or other predictions. The classification result information may include information related to a performance of the classification process (e.g., whether the predicted classification is correct or incorrect), or other information related to the classification.

In some embodiments, subsequent to the updating of the prediction model, the prediction model may be used to determine a classification for a specified incident based on the profile of the specified incident. As an example, information related to the profile of the specified incident may be obtained and provided to the prediction model to obtain one or more predictions from the prediction model. The predictions obtained from the prediction model may be used to determine the classification for the specified incident, determine whether the specified incident satisfies one or more criteria related to a particular classification, or generate other determinations. As an example, the predictions may include a prediction specifying that the specified incident belongs to a first classification, the specified incident cannot be classified (for e.g., lack of data), a prediction specifying a probability of a particular classification (e.g., "X % Likelihood of the specified incident being business process violation"), or other prediction.

In some embodiments, the prediction model may be configured or trained to recognize profiles of incidents that have a high likelihood of being associated with a particular classification similar to the classification of prior incidents that have been classified (e.g., based on training on prior information related to the profiles of incidents and their classification). As such, when profile related information of the specified incident (provided to the prediction model) matches such profiles, the prediction model will generate a prediction indicating that the specified incident should be classified under the particular classification.

Figure 3C:
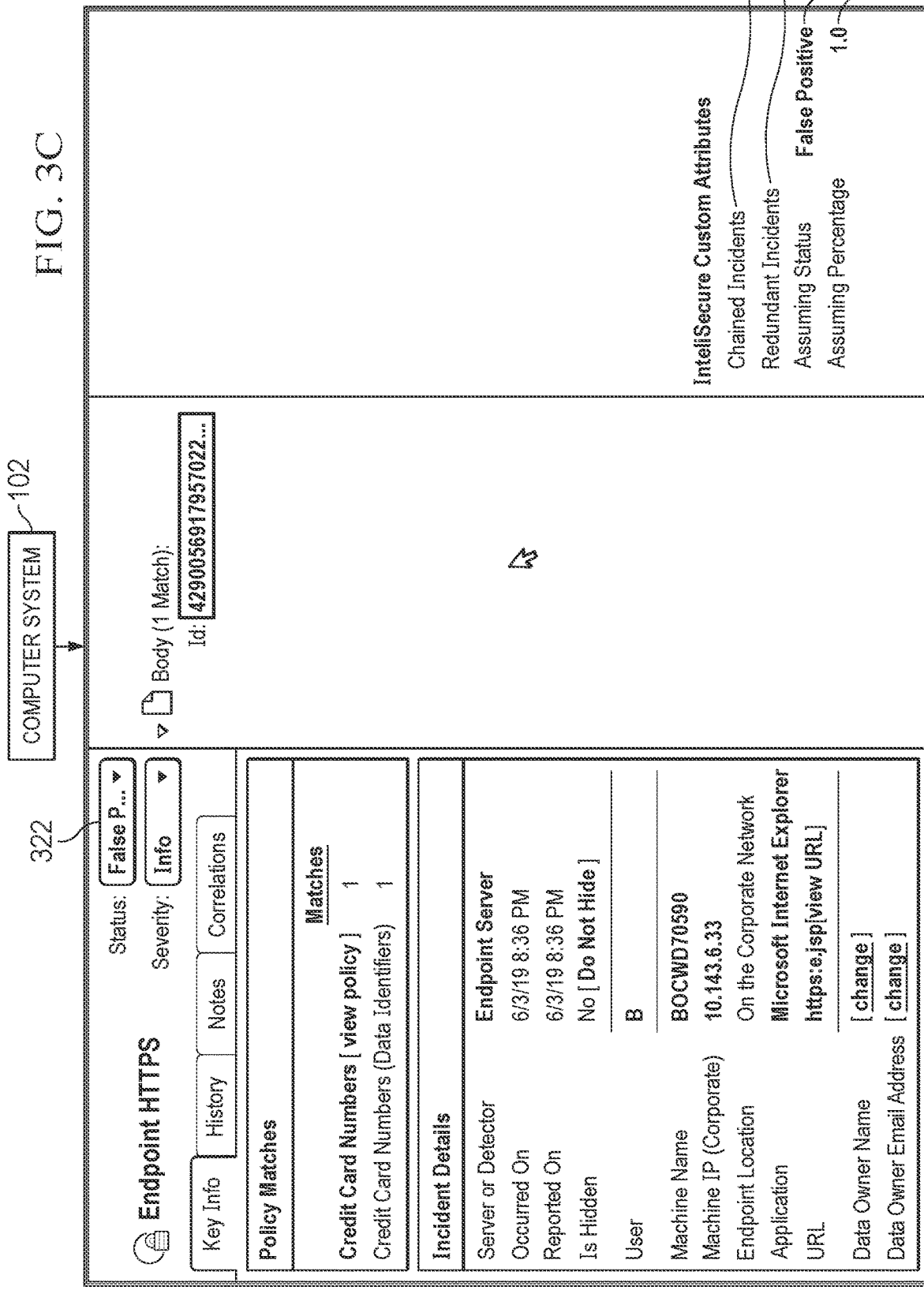
FIG. 3C is a screenshot of an incident with the classification, consistent with various embodiments.

As can be appreciated from the foregoing description, triaging subsystem 114 can determine the classification for a specified incident in many ways. After determining the classification, triaging subsystem 114 can update the incident to indicate the classification. FIG. 3C is a screenshot of an incident with the classification, consistent with various embodiments. For example, as illustrated in FIG. 3C, triaging subsystem 114 can update the status attribute 322 or the assuming status attribute 334 to indicate the classification of the incident. As described above, whether either or both the status attributes are updated can depend on a mode in which computer system 102 is operating. For example, in the "audit" mode, triaging subsystem 114 may update "assuming status" attribute 334 with the determined classification and "assuming percentage" attribute 336 with a probability of the incident 302 belonging to the determined classification. Triaging subsystem 114 may not update status attribute 322 (that is, leave the status attribute 322 with the original value) in the audit mode. In the "triage" mode, triaging subsystem 114 can update status attribute 322 with the determined classification, and optionally, "assuming status" attribute 334 too. The screenshot of FIG. 3C also shows "chained incidents" attribute 330 which provides information regarding a set of incidents that correspond to the same network event chained together. Similarly, "redundant incidents" attribute 332 provides information regarding a set of incidents that share a set of attributes linked together. Additional details with respect to chained incidents and redundant incidents are described at least with reference to FIGS. 8 and 9. In some embodiments, audit mode enables a user to compare the classification determined by the computer system 102 as indicated in the assuming status attribute with the classification determined by another entity, e.g., human users, as indicated in the status attribute, as illustrated in FIG. 3D.

FIG. 3D is a screenshot of a report 348 showing incidents classified in audit mode, consistent with various embodiments. Reporting subsystem 116 facilitates generation of various reports associated with classification of incidents. Report 348 shows classification of incidents in audit mode under four different classifications, e.g., "False Positive," "Indeterminate Behavior," "Note enough data," and "Uncertain". For example, row 338 shows that a total of "213" incidents are classified as "False positive" (as indicated in the assuming status attribute) by computer system 102. Row 340 shows that "204" of the "213" incidents are classified as "False positive" (as indicated in the status attribute) by an entity other than the computer system 102, such as a human user. Similarly, row 342 shows that "9" of the "213" incidents are classified as "Indeterminate Behavior" (as indicated in the status attribute) by a human user. Block 344 shows that a total of "282" incidents are classified as "Indeterminate Behavior" (as indicated in the assuming status attribute) by computer system 102, and of those "282," "256," "24" and "2" incidents are classified as "Indeterminate behavior," "authorized business process," and "false positive" (as indicated in the status attribute) by an entity other than the computer system 102, such as a human user. Similarly, block 346 shows that a total of "426" incidents are classified as "not enough data" (as indicated in the assuming status attribute) by computer system 102, and of those "426," "128," "297" and "1" incidents are classified as "false positive," "Indeterminate behavior," and "personal use" (as indicated in the status attribute) by an entity other than the computer system 102, such as a human user.

A user, e.g., an analyst or administrator associated with the server 122, can review the classification of the incidents, e.g., those that do not match with the classification of the computer system 102, and provide feedback to the computer system 102 accordingly. For example, the human user can indicate, e.g., via user feedback in the report 348, whether the computer system 102 or the user is correct in classifying the incidents in rows 342. If the computer system 102 is correct, the user can update the status attribute to the classification determined by the computer system 102, or if the user is correct, the computer system 102 can be configured to use the feedback to improve the accuracy in determining the classification for subsequent incidents.

Reporting subsystem 116 can also facilitate in managing redundant incidents. In some embodiments, reporting subsystem 116 can group similar incidents, e.g., incidents that share a set of attributes, such as a type, username, email address, and policy matches, into a single group. Further, in some embodiments, the same network event can trigger multiple policy violations and hence, can result in multiple incidents being created. Reporting subsystem 116 can identify such incidents that correspond to the same network event and chain them together into a single group.

In some embodiments, the incidents are grouped using a "group" attribute in the incident. The group attribute would have the same group identification (ID) for all the incidents that belong to a group. Such grouping can facilitate easy review of incidents to a user and allow for efficient mass-classification of incidents. In some embodiments, if an incident is classified into a specified classification, then all other incidents in the group can be automatically classified into the specified classification.

Figure 1B:
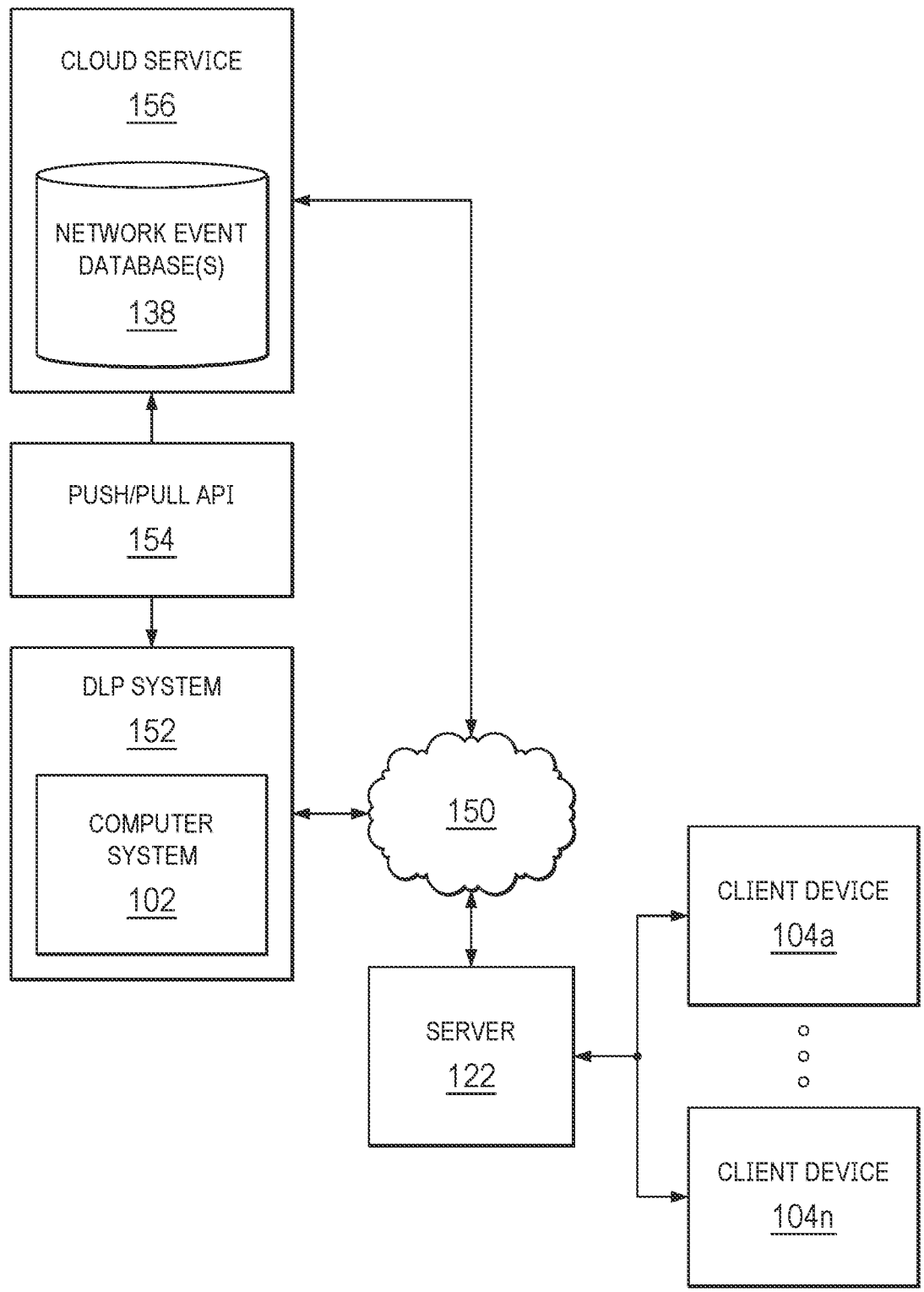
FIG. 1B is a block diagram showing a computer system integrated with a data loss prevention system, consistent with various embodiments.

FIG. 1B is a block diagram showing the computer system integrated with a DLP system 152, consistent with various embodiments. Incidents can be generated by network event subsystem 112 or a system other than network event subsystem 112, e.g., a DLP system 152 that monitors the user activity in association with the server 122 and the client devices 104a-104n for any data access policy violations. Incidents can be stored in and accessed from network event database 138. DLP system 152, such as the one provided by Symantec of Mountain View, California, can discover, monitor and protect sensitive data for an organization, e.g., by monitoring the server 122, client devices 104a-104n and other entities associated with a network of the organization. DLP system 152 provides data control across a broad range of data loss channels: cloud apps, endpoints, data repositories, and email and web communications. DLP system 152 can facilitate in managing data loss policies, such as policy 304, and generate incidents in the event of any policy violations. Computer system 102 can be integrated with DLP system 152 (via hardware or software) to process the incidents for determining the classifications. In some embodiments, DLP system 152 can issue a command to or trigger computer system 102 to process the incidents for determining the classifications, grouping redundant incidents, or chaining related incidents.

System 100 also includes a push/pull application programming interface (API) 154 to enable cloud service 156 associated with computer system 102 to receive or obtain incidents from DLP system 152, in real-time or near real-time. In some embodiments, the push portion of the push/pull API 154 can be located at DLP system 152, and push the information regarding incidents to the cloud service 156. Similarly, the pull portion of push/pull API 154 can be located at the cloud service 156 and can retrieve information regarding incidents from DLP system 152. In some embodiments, receiving information in near real-time includes receiving information regarding the incidents at cloud service 156 within a specified threshold duration from when an incident is generated by DLP system 152. Such information retrieval can facilitate an organization, e.g., user associated with server 122, to consume the incidents or review the reports, such as report 348, in real-time or near real-time.

Example Flowcharts

FIGS. 4-7 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4:
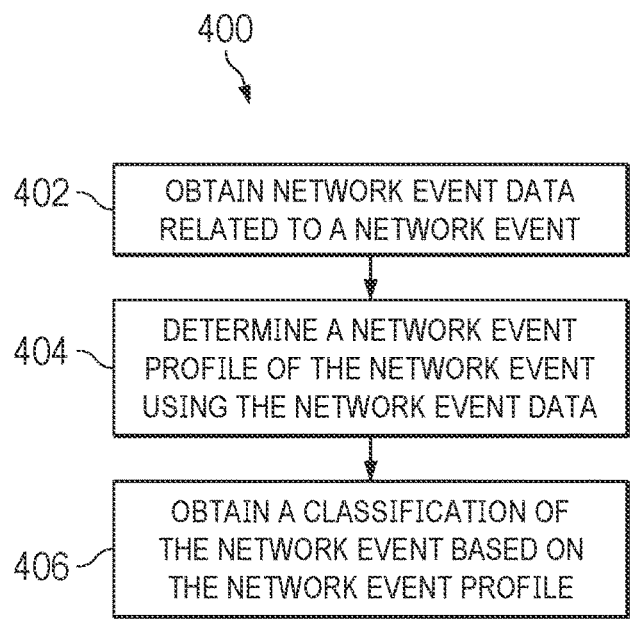
FIG. 4 shows a flowchart of a method of determining a classification of a network event, consistent with various embodiments.

FIG. 4 shows a flowchart of a method 400 of determining a classification of a network event, consistent with various embodiments. In an operation 402, network event data related to a network event may be obtained. As an example, the network event can be an incident and network event data related to the network event can be one or more attributes of the incident, e.g., as described at least with reference to FIGS. 1A and 3A. Operation 402 may be performed by a subsystem that is the same as or similar to network event subsystem 112.

In an operation 404, a network event profile is determined using the network event data. As an example, the network event profile can be a profile of the incident and includes at least a subset of the attributes of the incident, as described at least with reference to FIGS. 1A and 5. Operation 404 may be performed by a subsystem that is the same as or similar to network event subsystem 112.

In an operation 406, a classification of the network event is determined based on the network event profile. As an example, the profile of the incident is processed to determine a classification for the incident. In some embodiments, the classification of the incident is determined based on the classification of previously classified incidents having profiles matching with that of the incident, as described at least with reference to FIGS. 1A and 6. Operation 406 may be performed by a subsystem that is the same as or similar to triaging subsystem 114.

In some embodiments, at least a portion of the method 400 may be performed at a time when a new network event or a specified number of new network events are detected. The method 400 may also be performed in response to a user request for determining the classification. In some embodiments, a user, e.g., an administrator associated with server 122, can define when the method 400 is to be executed.

A new network event can be an incident that is not yet classified, or an incident with a status attribute having a specified value, e.g., "new," indicating that the incident is not yet classified.

Figure 5:
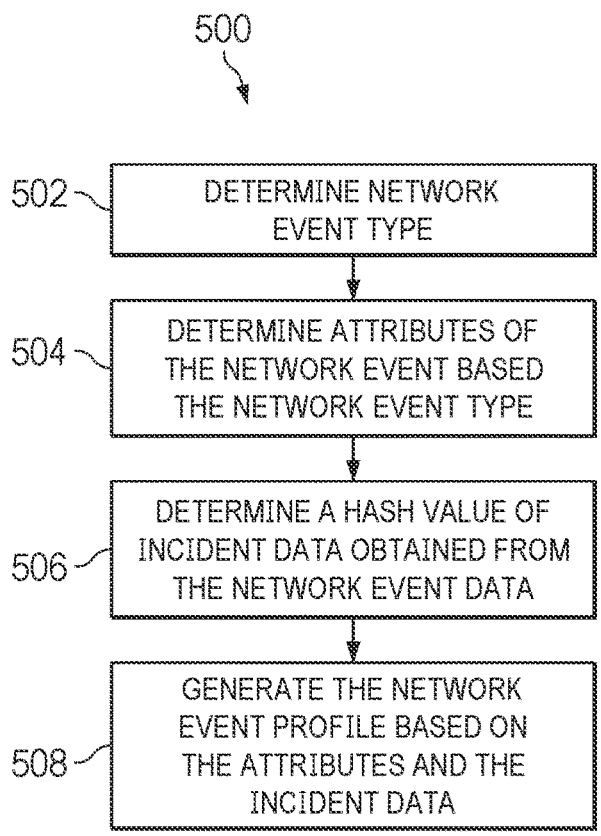
FIG. 5 shows a flowchart of a method of generating a network event profile, consistent with various embodiments.

FIG. 5 shows a flowchart of a method 500 of generating a network event profile, consistent with various embodiments. In some embodiments, the method 500 can be performed as part of operation 404 of method 400. In an operation 502, a network event type is determined from the network event data. As an example, the network event type can be a type of the incident, e.g., "Application", "Discover," "Endpoint" or "Network." Each of the types of the incident is associated with a distinct set of attributes. The type of the incident can be representative of a location where the incident occurred/is identified. The type of the incident can be obtained from the one or more attributes of the incident. Operation 502 may be performed by a subsystem that is the same as or similar to network event subsystem 112.

In an operation 504, the attributes of the network event that may be used in determining the classification of the network event are identified based on the type of the network event. As example, for an incident of type "Application" or "Discover," a policy violated, a policy version, a policy match count, or a file owner can be used for determining the classification. In another example, for an incident of type "Endpoint," a policy violated, a policy version, a policy match count, a file owner, or an application used can be used for determining the classification. In another example, for an incident of type "Network," a policy violated, a policy version, a policy match count, a message originator (originator of a message that violates the policy), or a sender/recipient of the message can be used for determining the classification. Operation 504 may be performed by a subsystem that is the same as or similar to network event subsystem 112.

In an operation 506, a hash value of the incident data is determined. As an example, incident data is the non-afflicting content in an incident. In some embodiments, non-afflicting content is content of the incident other than afflicting content that likely caused the data policy violation. In some embodiments, hash value is generated using a hashing function such as SHA. Operation 506 may be performed by a subsystem that is the same as or similar to network event subsystem 112.

In an operation 508, a network event profile is generated based on the attributes and the incident data. As an example, the profile of the incident is generated using the attributes and the hash value determined in operations 504 and 506, respectively. Operation 508 may be performed by a subsystem that is the same as or similar to network event subsystem 112.

Figure 6:
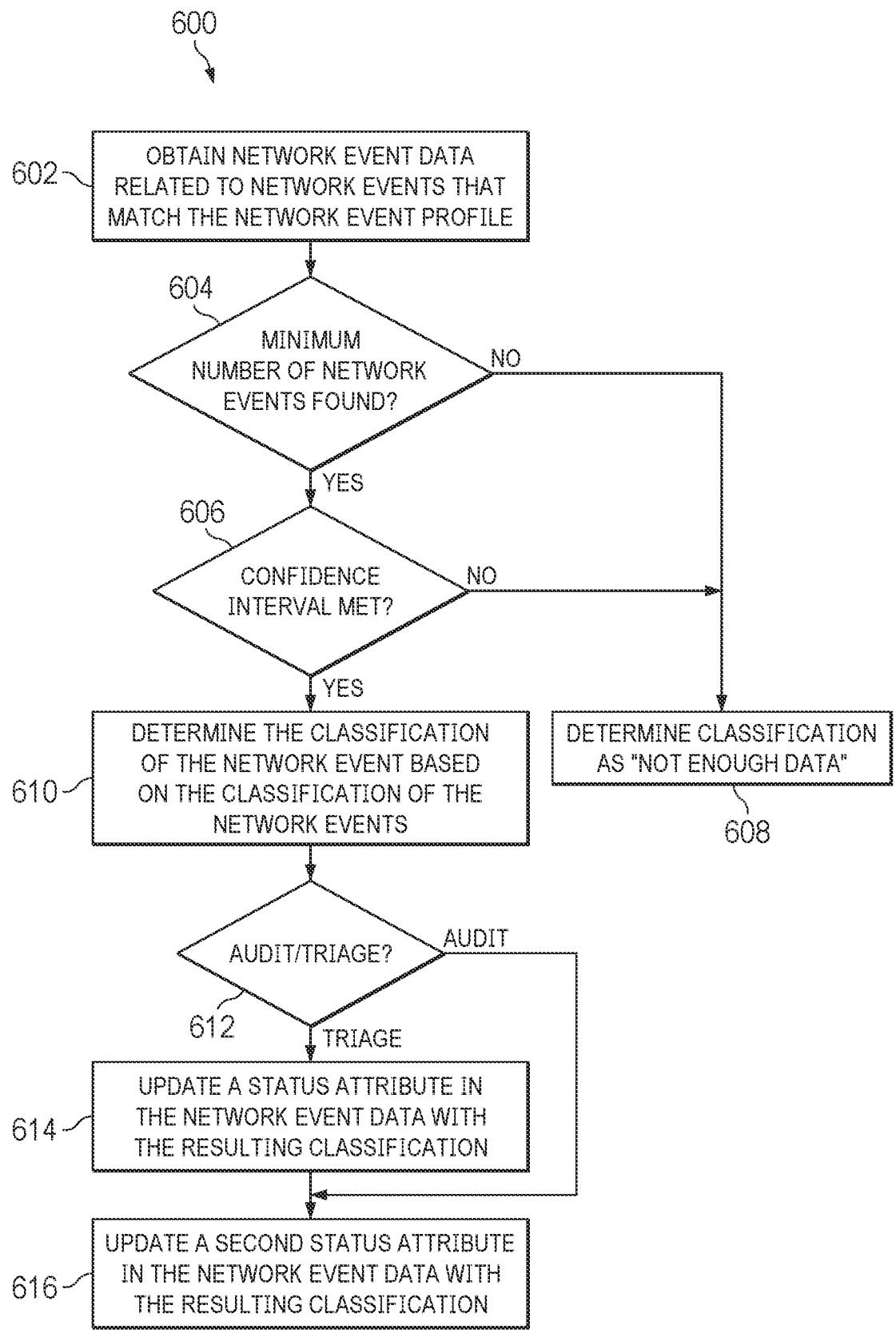
FIG. 6 shows a flowchart of a method of determining the classification of the network event, consistent with various embodiments.

FIG. 6 shows a flowchart of a method 600 of determining the classification of the network event, consistent with various embodiments. In some embodiments, the method 600 can be performed as part of operation 406 of method 400. In an operation 602, network event data related to network events that match the network event profile of a network event to be classified may be obtained. As an example, a set of incidents having profiles that match the profile of the incident to be classified is obtained. In some embodiments, the set of incidents are prior incidents that have been classified, e.g., by computer system 102 or another entity, e.g., a human user. The set of incidents may be stored in network event database 138.

In an operation 604, whether a minimum number of matching network events are found is determined. As an example, whether a quantity of incidents in the set of incidents exceeds a first threshold may be determined. If the quantity of incidents does not exceed the first threshold, in operation 608, the classification for the incident is determined as "not enough data," indicating a lack of data for classifying the incident.

If the quantity of incidents exceeds the first threshold, in operation 606, whether a confidence interval of any of the classifications of the set of incidents exceeds a second threshold is determined. If the confidence interval does not exceed the second threshold, in operation 608, the classification for the incident is determined as "not enough data," indicating a lack of data for classifying the incident.

If the confidence interval of any of the classifications of the set of incidents exceeds the second threshold, in operation 610, the corresponding classification of the set of incidents is determined as the classification of the incident.

In operation 612, whether the classification is determined in audit mode or triage mode is determined. If the classification is determined in audit mode, in operation 616, a second status attribute, such as "assuming status" attribute, which indicates an "assumed" classification of the incident is updated with the classification. If the classification is determined in triage mode, in operation 614, a "status" attribute, which indicates the actual classification of the incident, is updated with the classification. Optionally, the "assuming status" attribute of the incident may also be updated in addition to the status attribute in the triage mode.

In some embodiments, a user, e.g., an administrator associated with server 122, can define in which mode the classification is to be determined.

Operations 602-616 may be performed by a subsystem that is the same as or similar to triaging subsystem 114.

Figure 7:
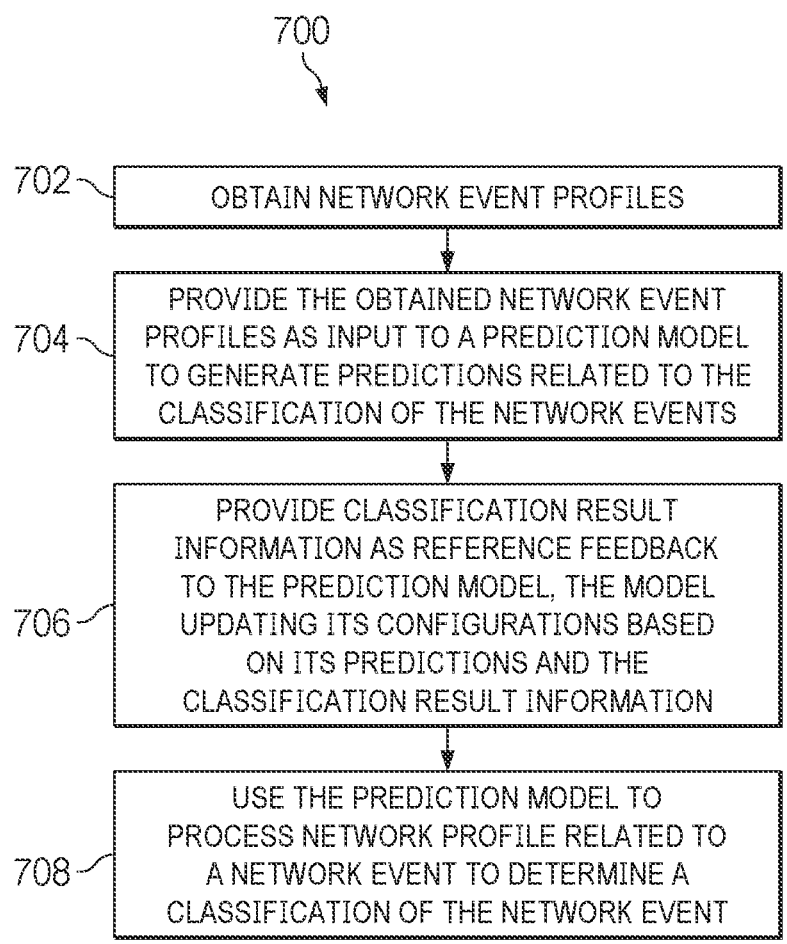
FIG. 7 shows a flowchart of a method of determining the classification of a network event via a prediction model, consistent with various embodiments.

FIG. 7 shows a flowchart of a method 700 of determining the classification of a network event via a prediction model, consistent with various embodiments. In operation 702, profiles of network events may be obtained. As an example, profiles of a set of incidents stored in a database 132 is obtained. Operation 702 may be performed by a subsystem that is the same as or similar to model subsystem 118.

In operation 704, the obtained network event profiles may be provided as input to a prediction model to generate predictions. As an example, the predictions may be related to the classification of the set of incidents, such as whether a specified incident cannot be classified (for e.g., lack of data), a prediction specifying a probability of a particular classification (e.g., "X % Likelihood of the specified incident being business process violation"). Operation 704 may be performed by a subsystem that is the same as or similar to model subsystem 118.

In an operation 706, classification result information may be provided as reference feedback to the prediction model. As an example, the classification result information may include information related to a performance of the classification process (e.g., whether the predicted classification is correct or incorrect), or other information related to the classification. In some embodiments, the reference feedback can cause the prediction model to assess its predictions against the classification result information. As an example, the prediction model may update its configurations (e.g., weights, biases, or other parameters) based on its assessment of the predictions. Operation 706 may be performed by a subsystem that is the same as or similar to feedback subsystem 120.

In an operation 708, subsequent to the updating of the prediction model, the prediction model may be used to determine the classification of an incident. As an example, profile of an incident may be obtained and provided to the prediction model to obtain one or more predictions from the prediction model. The predictions obtained from the prediction model may be used to determine the classification for the incident, determine whether the incident satisfies one or more criteria related to a particular classification, or generate other determinations. As an example, the predictions may include a prediction specifying that the incident belongs to a first classification, the incident cannot be classified (for e.g., lack of data), a prediction specifying a probability of a particular classification (e.g., "X % Likelihood of the incident being business process violation"), or other prediction. Operation 708 may be performed by a subsystem that is the same as or similar to triaging subsystem 114.

Figure 8:
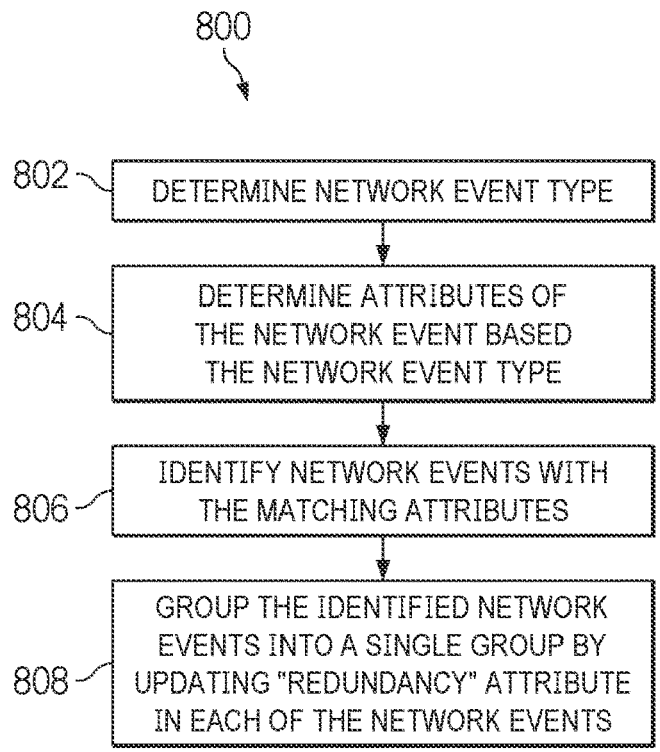
FIG. 8 shows a flowchart of a method of grouping redundant network events, consistent with various embodiments.

FIG. 8 shows a flowchart of a method 800 of grouping redundant network events, consistent with various embodiments. In operation 802, a type of a specified network event may be obtained. As an example, a type of a specified incident is obtained from the specified incident. Operation 802 may be performed by a subsystem that is the same as or similar to network event subsystem 112.

In an operation 804, a set of attributes of the specified network event that may be used in determining redundant network events are determined based on the type of the specified network event. As an example, the set of attributes that may be used in determining the redundant incidents are similar to the attributes associated with a profile of an incident. Operation 804 may be performed by a subsystem that is the same as or similar to network event subsystem 112.

In an operation 806, network events that are of the same type as the specified network event and having attributes matching with the set of attributes of the specified network event are determined. As an example, incidents that are of the same type as the specified incident and having attributes matching with the set of attributes of the specified incident are determined. Operation 806 may be performed by a subsystem that is the same as or similar to network event subsystem 112.

In an operation 808, the specified network event and the network events determined in operation 806 are grouped into a single group. As an example, the specified incident and the incidents determined in operation 806 are grouped into a single group, e.g., by updating a group attribute such as "redundant incidents" attribute 332 associated with each of the incidents with a specified group ID. Operation 808 may be performed by a subsystem that is the same as or similar to reporting subsystem 116.

Figure 9:
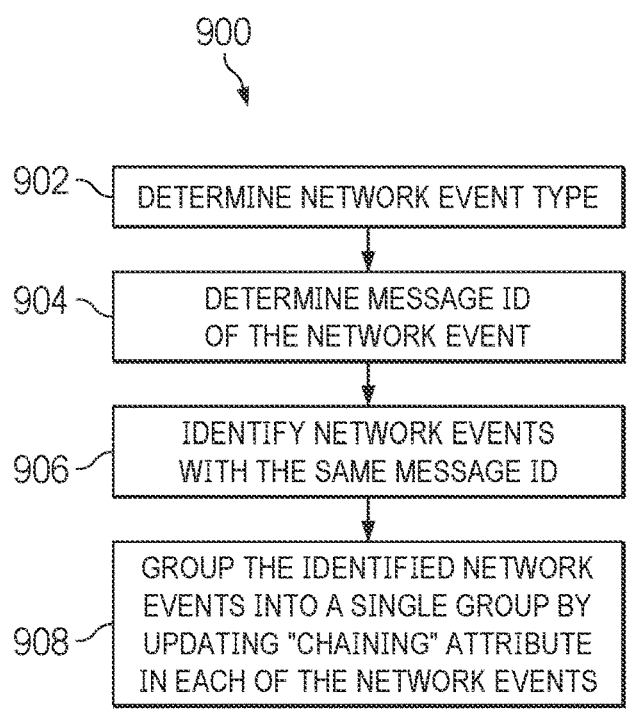
FIG. 9 shows a flowchart of a method of grouping similar network events, consistent with various embodiments.

FIG. 9 shows a flowchart of a method 900 of grouping similar network events, consistent with various embodiments. In operation 902, a type of a specified network event may be obtained. As an example, a type of a specified incident is obtained from the specified incident. Operation 902 may be performed by a subsystem that is the same as or similar to network event subsystem 112.

In an operation 904, a message ID attribute of the specified network event may be obtained. As an example, a message ID attribute provides an ID of a message/user activity that triggered a policy violation. In some embodiments, a message can violate multiple policies, which can result in generation of multiple incidents. Such incidents may have the same message ID. Operation 904 may be performed by a subsystem that is the same as or similar to network event subsystem 112.

In an operation 906, network events that are of the same type as the specified network event and having the same message ID as the specified network event are determined. As an example, incidents that are of the same type as the specified incident and having the same message ID as the specified incident are determined. Operation 906 may be performed by a subsystem that is the same as or similar to network event subsystem 112.

In an operation 908, the specified network event and the network events determined in operation 906 are grouped into a single group. As an example, the specified incident and the incidents determined in operation 906 are grouped into a single group, e.g., by updating a group attribute such as "chained incidents" attribute 330 associated with each of the incidents with a specified group ID. Operation 908 may be performed by a subsystem that is the same as or similar to reporting subsystem 116.

In some embodiments, the various computers and subsystems illustrated in FIGS. 1A and 1B may include one or more computing devices that are programmed to perform the functions described herein. The computing devices may include one or more electronic storages (e.g., prediction database(s) 132, which may include training data database(s) 134, model database(s) 136, network event database(s) 138, etc., or other electronic storages), one or more physical processors programmed with one or more computer program instructions, and/or other components. The computing devices may include communication lines or ports to enable the exchange of information within a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 described herein is for illustrative purposes, and is not intended to be limiting, as any of subsystems 112-120 may provide more or less functionality than is described. For example, one or more of subsystems 112-120 may be eliminated, and some or all of its functionality may be provided by other ones of subsystems 112-120. As another example, additional subsystems may be programmed to perform some or all of the functionality attributed herein to one of subsystems 112-120.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system comprising:
    a computer system comprising one or more processors programmed with computer program instructions that, when executed, cause the computer system to:
    collect incident data of an incident, the incident data containing:
        afflicting content of the incident, wherein the incident is representative of a user activity violating a policy with respect to a data item; and
        non-afflicting content, wherein the non-afflicting content comprises metadata associated with the incident but not directly indicative of the violating of the policy;
    generate a profile of the incident, wherein the generating of the profile comprises:
        extracting the non-afflicting content from the incident data;
        determining a hash for the profile by hashing at least the extracted non-afflicting content of the incident; and
        determining a network event type for the profile from the incident data, the network event type representative of a location where the incident occurred or is identified, wherein the network event type is associated with a set of attributes; and
    provide the profile of the incident to a classification model for classifying the incident, which improves speed of classifying the incident.

2. The system of claim 1, wherein the computer system is caused to:
    determine a classification of the incident as a first classification based on:
        a quantity of other incidents having reference profiles that match the profile exceeding a first threshold, and
        a confidence interval of the first classification exceeding a second threshold, wherein the first classification is one of one or more classifications of the other incidents having reference profiles that match the profile.

3. The system of claim 1, wherein the computer system is caused to:
    in response to determining that a classification mode is "audit" mode, determine a classification as a second classification, wherein the incident data includes a first classification indicating that the classification of the incident was determined by an entity other than the computer system.

4. A method, comprising:
    collecting, by a processor, incident data of an incident, the incident data containing:
        afflicting content of the incident, wherein the incident is representative of a user activity violating a policy with respect to a data item; and
        non-afflicting content, wherein the non-afflicting content comprises metadata associated with the incident but not directly indicative of the violating of the policy;
    generating, by the processor, a profile of the incident, wherein the generating of the profile comprises:
        extracting the non-afflicting content from the incident data;
        determining a hash for the profile by hashing at least the extracted non-afflicting content of the incident; and
        determining a network event type for the profile from the incident data, the network event type representative of a location where the incident occurred or is identified, wherein the network event type is associated with a set of attributes; and provide the profile of the incident to a classification model for classifying the incident, which improves speed of classifying the incident.

5. The method of claim 4, further comprising:
generating the classification for the incident based on the profile, wherein the generating the classification includes:
determining the classification of the incident as one of one or more classifications of a set of other incidents having reference profiles that match the profile.

6. The method of claim 4, further comprising:
generating the classification for the incident based on the profile, wherein the generating the classification includes:
determining the classification of the incident as different from one or more classifications of a set of other incidents having reference profiles that match the profile.

7. The method of claim 6, wherein generating the classification further includes:
determining the classification as a specified value, the specified value indicating a lack of data for classifying the incident.

8. The method of claim 4, further comprising:
generating the classification for the incident based on the profile, wherein generating the classification includes:
determining the classification of the incident as a first classification based on:
a quantity of other incidents having reference profiles that match the profile exceeding a first threshold, and
a confidence interval of the first classification exceeding a second threshold, wherein the first classification is one of one or more classifications of the other incidents having reference profiles that match the profile.

9. The method of claim 4, further comprising:
generating the classification for the incident based on the profile, wherein generating the classification includes:
determining the classification as a specified value, the specified value indicating a lack of data for classifying the incident based on a quantity of other incidents having reference profiles that match the profile being below a first threshold.

10. The method of claim 4, further comprising:
generating the classification for the incident based on the profile, wherein generating the classification includes:
determining the classification as a specified value, the specified value indicating a lack of confidence for classifying the incident based on a confidence interval of one or more classifications of other incidents having reference profiles that match the profile being below a second threshold.

11. The method of claim 4, further comprising:
generating the classification for the incident based on the profile, wherein generating the classification includes:
in response to determining a classification mode to be an "audit" mode:
generating the classification as a second classification in the incident data, wherein the incident data includes a first classification indicating a classification of the incident determined by an entity other than the processor.

12. The method of claim 11, wherein the entity other than the processor includes a human user.

13. The method of claim 4, wherein the set of attributes comprises at least one of:
(a) a user associated with the incident,
(b) a user associated with a file on which incident is performed,
(c) a policy that is violated,
(d) a version of the policy that is violated,
(e) an application associated with the incident, or
(f) a computing device associated with the incident.

14. The method of claim 4, further comprising:
hashing at least a portion of the incident data, wherein hashing at least the portion of the incident data includes:
identifying a first portion of the incident data that triggered the incident, and
hashing the incident data without the first portion to generate the hash value of the non-afflicting content of the incident.

15. The method of claim 4 further comprising:
generating a report showing information for a group of incidents, the information including, for each incident from the group of incidents:
a first classification and a second classification of the corresponding incident, wherein the first classification indicates a classification determined by an entity other than the processor and the second classification indicates the classification determined by the processor.

16. The method of claim 15, wherein the report includes:
a first subset of incidents from the group of incidents in which the first classification and the second classification indicate the same classification, and
a second subset of incidents from the group of incidents in which the first classification and the second classification indicate different classifications.

17. A non-transitory computer-readable medium storing instructions that, when executed by one or more processors, cause the one or more processors to perform:
collecting incident data of an incident, the incident data containing:
afflicting content of the incident, wherein the incident is representative of a user activity violating a policy with respect to a data item; and
non-afflicting content, wherein the non-afflicting content comprises metadata associated with the incident but not directly indicative of the violating of the policy;
generating a profile of the incident, wherein the generating of the profile includes:
extracting the non-afflicting content from the incident data;
determining a hash for the profile by hashing at least the extracted non-afflicting content of the incident; and
determining a network event type for the profile from the incident data, the network event type representative of a location where the incident occurred or is identified, wherein the network event type is associated with a set of attributes; and
providing the profile of the incident to a prediction model being configured to generate a classification for the incident, which improves speed of classifying the incident.

18. The computer-readable medium of claim 17, wherein the instructions, when further executed, cause the one or more processors to perform:
- generating the classification for the incident based on the profile, wherein generating the classification comprises:
  - determining the classification of the incident as a first classification of the one or more classifications of the set of other incidents based on:
    - a quantity of other incidents in the set of other incidents exceeding a first threshold, and
    - a confidence interval of the first classification exceeding a second threshold.

19. The computer-readable medium of claim 17, wherein the instructions, when further executed, cause the one or more processors to perform:
- generating the classification for the incident based on the profile, wherein the generating the classification includes:
  - determining the classification of the incident as one of one or more classifications of a set of incident having reference profiles that match the profile.

20. The computer-readable medium of claim 19, wherein the instructions, when further executed, cause the one or more processors to perform:
- determining the set of other incidents having the reference profiles that match with profile, wherein each of the reference profiles includes a reference hash value that matches the hash value.

* * * * *